US008496777B2

(12) United States Patent
Lee et al.

(10) Patent No.: US 8,496,777 B2
(45) Date of Patent: Jul. 30, 2013

(54) MULTI-LAYER DECORATING ELEMENT AND METHOD OF ITS MANUFACTURE

(75) Inventors: Chi-Shih Lee, Taichung (TW); Chun-Hsien Lee, Taichung (TW); Meng-Chun Wang, Taichung (TW)

(73) Assignee: Jah Yih Enterprise Co., Ltd., Taichung (TW)

( * ) Notice: Subject to any disclaimer, the term of this patent is extended or adjusted under 35 U.S.C. 154(b) by 234 days.

(21) Appl. No.: 13/053,494

(22) Filed: Mar. 22, 2011

(65) Prior Publication Data
US 2012/0189852 A1 Jul. 26, 2012

(30) Foreign Application Priority Data

Jan. 20, 2011 (TW) .............................. 100102158 A
Feb. 1, 2011 (TW) .............................. 100103917 A (51) Int. Cl.
*B29C 65/48* (2006.01)
*B32B 37/12* (2006.01)
*B32B 37/26* (2006.01)
*B32B 38/10* (2006.01)
*B32B 43/00* (2006.01)
*C09J 5/10* (2006.01)
*C08J 5/12* (2006.01)

(52) U.S. Cl.
USPC ..... 156/247; 156/289; 156/306.6; 156/307.3; 156/308.2; 156/309.6

(58) Field of Classification Search
USPC ................... 156/247, 289, 305, 306.6, 307.3, 156/308.2, 309.6
See application file for complete search history.

(56) References Cited

U.S. PATENT DOCUMENTS

| 3,568,339 | A | * | 3/1971 | Hara et al. ......................... 36/87 |
| 4,347,673 | A | * | 9/1982 | Svetlik ........................... 36/32 R |
| 4,899,411 | A | * | 2/1990 | Johnson et al. ............... 12/142 R |
| 6,025,064 | A | * | 2/2000 | Kawata et al. .............. 428/304.4 |
| 6,765,123 | B2 | * | 7/2004 | de Jong et al. ................. 602/56 |
| 6,769,204 | B1 | * | 8/2004 | Phillips ............................ 36/136 |
| 6,802,140 | B2 | * | 10/2004 | Aslanides ........................ 36/136 |
| 7,611,767 | B2 | * | 11/2009 | Usui et al. ...................... 428/208 |
| 7,625,625 | B2 | * | 12/2009 | Rios et al. ...................... 428/141 |
| 7,827,704 | B2 | * | 11/2010 | Fox et al. ........................... 36/44 |
| 7,832,123 | B2 | | 11/2010 | Fallon et al. .................... 36/100 |
| 8,012,293 | B2 | * | 9/2011 | Lee ................................ 156/249 |
| 8,091,963 | B2 | * | 1/2012 | Wyner et al. ................... 297/214 |
| 2002/0078599 | A1 | * | 6/2002 | Delgorgue et al. ............... 36/98 |
| 2003/0176130 | A1 | * | 9/2003 | Lee ................................ 442/239 |

(Continued)

FOREIGN PATENT DOCUMENTS

JP 2011224791 A * 11/2011

OTHER PUBLICATIONS

English Abstract of JP 2011-224791 (Jan. 25, 2013).*

*Primary Examiner* — Sing P Chan
(74) *Attorney, Agent, or Firm* — Alan Kamrath; Kamrath IP Lawfirm, P.A.

(57) ABSTRACT

A method for producing a multi-layer decorating element includes the steps of: (a) providing a base, a first plate, a second plate and a fixing layer; (b) stacking the first and second plates onto one of the base and the fixing layer; (c) stacking the other of the base and the fixing layer onto one of the base and the fixing layer to form a stacked array; (d) hot pressing the stacked array; and (e) removing the fixing layer.

10 Claims, 15 Drawing Sheets

U.S. PATENT DOCUMENTS

| | | | |
|---|---|---|---|
| 2004/0042965 A1* | 3/2004 | Usui et al. | 424/40 |
| 2004/0087230 A1* | 5/2004 | Wildeman | 442/172 |
| 2004/0149732 A1* | 8/2004 | Usui et al. | 219/528 |
| 2004/0172855 A1* | 9/2004 | Aslanides | 36/136 |
| 2005/0161144 A1* | 7/2005 | Nakajima et al. | 156/73.1 |
| 2007/0148409 A1* | 6/2007 | Rios et al. | 428/167 |
| 2009/0162596 A1* | 6/2009 | Rios et al. | 428/45 |
| 2010/0080966 A1* | 4/2010 | Lee | 428/203 |
| 2012/0186102 A1* | 7/2012 | Lee et al. | 36/45 |
| 2012/0267043 A1* | 10/2012 | Lee | 156/247 |
| 2012/0297642 A1* | 11/2012 | Schaefer et al. | 36/45 |
| 2012/0297643 A1* | 11/2012 | Shaffer et al. | 36/83 |

\* cited by examiner

MULTI-LAYER DECORATING ELEMENT AND METHOD OF ITS MANUFACTURE

BACKGROUND OF THE INVENTION

1. Field of the Invention

The present invention relates generally to a multi-layer decorating element and, more particularly, to a multi-layer decorating element for decorating materials such like shoes or bags.

2. Description of the Related Art

Shoes have been specialized and improved for years. Currently, shoe manufacturers and designers provide specialized shoes for many activities, such as, for example, running shoes, tennis shoes, cycling shoes, walking shoes, cross-trainers, and the like. These shoes can be designed to respond to particular pressures and hot spots for the assumed usage.

U.S. Pat. No. 7,832,123 shows a set of shoes for use by members of a team. The shoes allow for a uniform appearance in a team environment by way of substantially similar uppers, while providing individualized performance specifications, with respect to support and breathability, for each upper. The substantially similar appearance of the upper may be due to material overlays, stitch patterns, color scheme and/or perforations and may be based on team criteria. The uppers are materially different from each other due to internal or external supports, material types and/or breathability.

Presently, the construction of a shoe upper requires a substantial amount of manual labor. While the production of a sole of a modern sport shoe can be automated to a great extent, the stitching of the different materials of the upper still requires a significant amount of manual labor.

The present invention is, therefore, intended to obviate or at least alleviate the problems encountered in the prior art.

SUMMARY OF THE INVENTION

According to the present invention, the main purpose is to provide a method for producing a multi-layer decorating element which includes the steps of: (a) providing a base, a first plate, a second plate and a fixing layer; (b) stacking the first and second plates onto one of the base and the fixing layer; (c) stacking the other of the base and the fixing layer onto one of the base and the fixing layer to form a stacked array; (d) hot pressing the stacked array; and (e) removing the fixing layer.

An advantage of the method for producing the multi-layer decorating element according to the present invention is that the first and second plates are connected with each other by hot pressing rather than stitching, thereby allowing the multilayer decorating element to be processed accurately, conveniently and in a cost-saving manner.

Other advantages and features of the present invention will become apparent from the following description referring to the drawings.

BRIEF DESCRIPTION OF THE DRAWINGS

The present invention will be described through detailed illustration of the preferred embodiments referring to the drawings.

DETAILED DESCRIPTION OF THE PREFERRED EMBODIMENTS

The present invention will be described through detailed illustration of three embodiments referring to the drawings.

Figure 1:
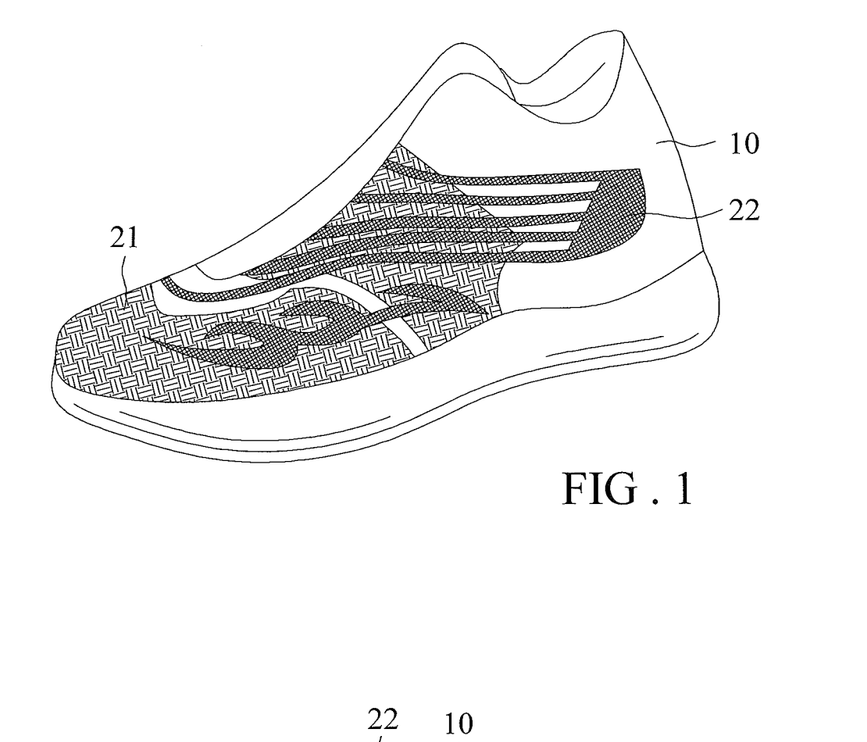
FIG. 1 shows a shoe with a multi-layer decorating element according to the present invention.
Figure 2:
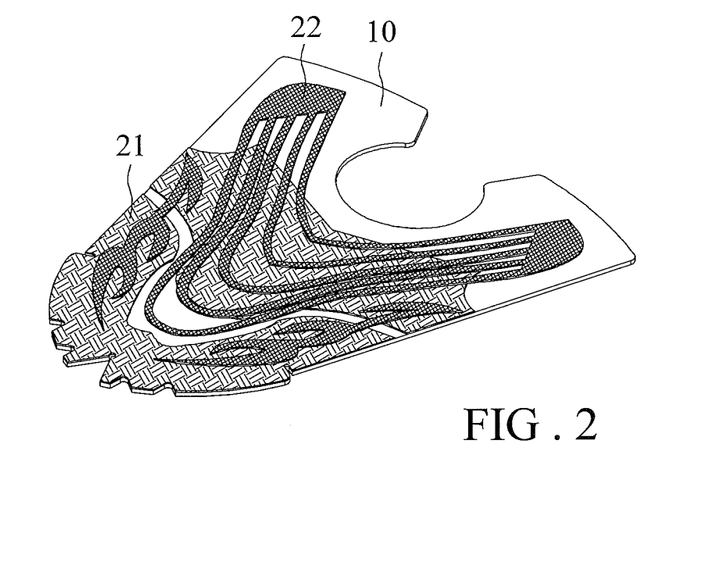
FIG. 2 is a perspective view of the multi-layer decorating element according to a first embodiment of the present invention.

Referring to FIGS. 1 and 2, there is shown a multi-layer decorating element according to a first embodiment of the present invention. The multi-layer decorating element is adapted for coupling with an upper of the shoe (as shown in FIG. 1) or with an outer surface of a bag. The multi-layer decorating element comprises a base 10, a first plate 21 and a second plate 22 both connected to the base 10.

Figure 3:
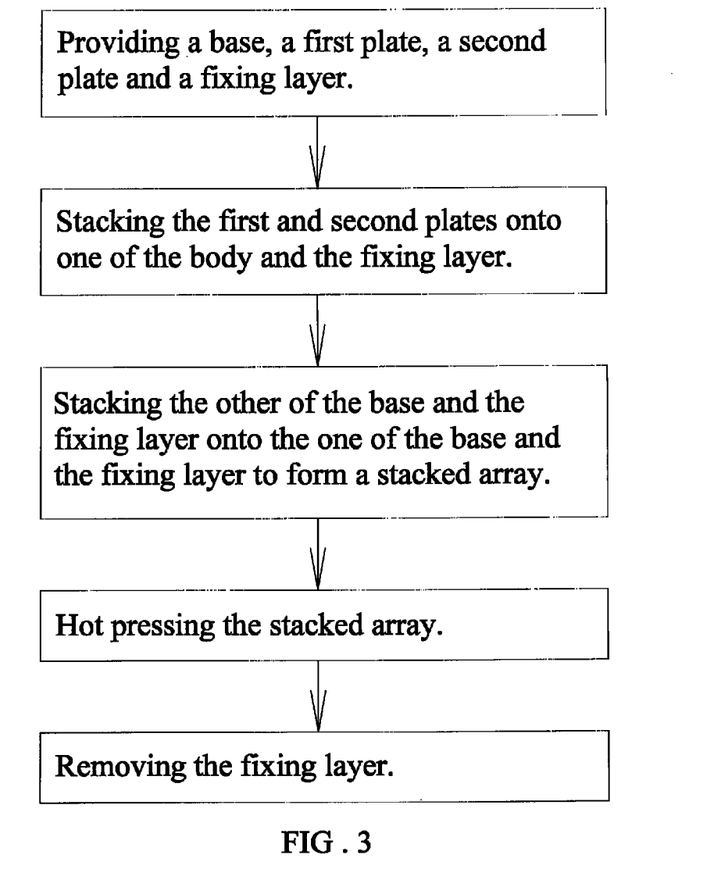
FIG. 3 is a flow chart of a method for producing a multi-layer decorating element, in accordance with the present invention.

Referring to FIG. 3, a method for producing the multi-layer decorating element includes the steps of: (a) providing a base, a first plate, a second plate and a fixing layer; (b) stacking the first and second plates onto one of the base and the fixing layer; (c) stacking the other of the base and the fixing layer onto one of the base and the fixing layer to form a stacked array; (d) hot pressing the stacked array; and (e) removing the fixing layer.

Figure 4:
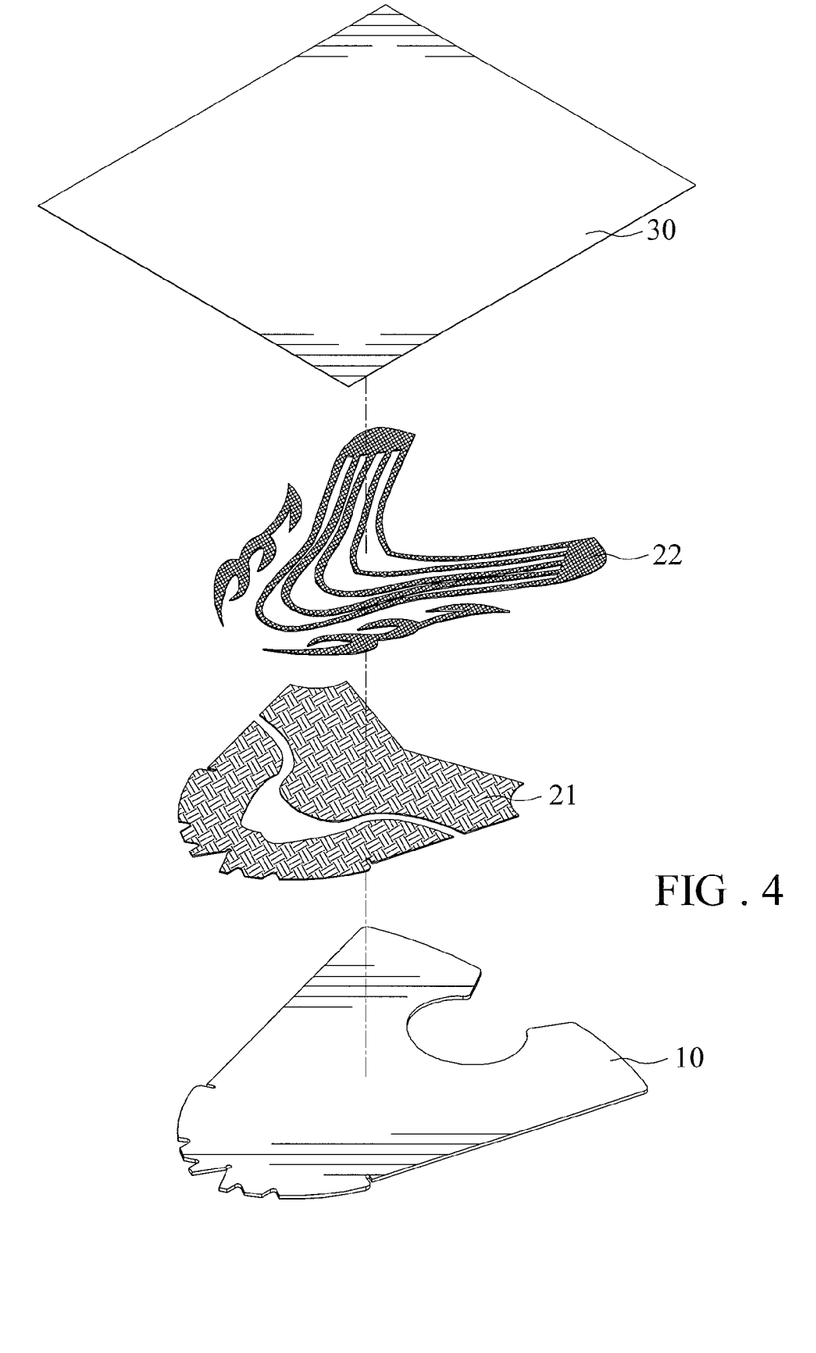
FIG. 4 is an exploded perspective view of the multi-layer decorating element of FIG. 2.
Figure 5:
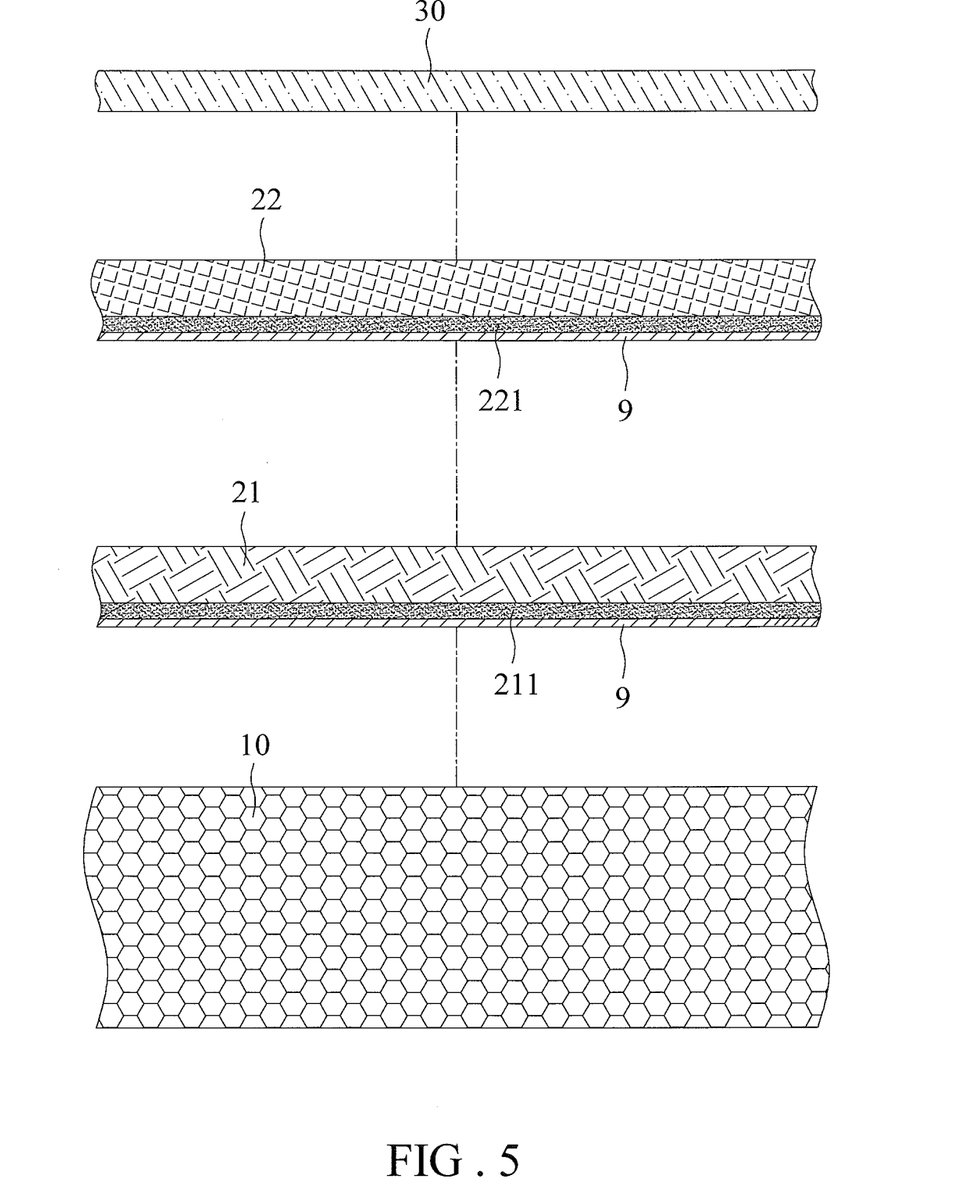
FIG. 5 is a cross-section view of FIG. 4 and shows a first plate stacked onto a base and a second layer stacked onto the first plate.

Referring to FIGS. 4 and 5, each of the base 10, the first plate 21 and the second plate 22 is cut to a required shape, respectively. The base 10 may be constructed of cloth or leather.

The first plate 21 may be constructed of thermoplastic polyurethane (TPU) or polyurethane (PU). The first plate 21 includes a proximal side, a distal side opposite from the proximal side and a hot melt glue layer 211 provided on the proximal side thereof in which the hot melt glue layer 211 has a release liner 9 in releasable contact therewith.

The second plate 22 may be constructed of thermoplastic polyurethane (TPU) or polyurethane (PU). The second plate 22 includes a proximal side, a distal side opposite from the proximal side and a hot melt glue layer 221 provided on the proximal side thereof in which the hot melt glue layer 221 has a release liner 9 in releasable contact therewith.

The fixing layer 30 is easy to stick on and to remove from the base 10, and the first and second plates 21 and 22, even through the fixing layer 30 is hot pressed.

Figure 6:
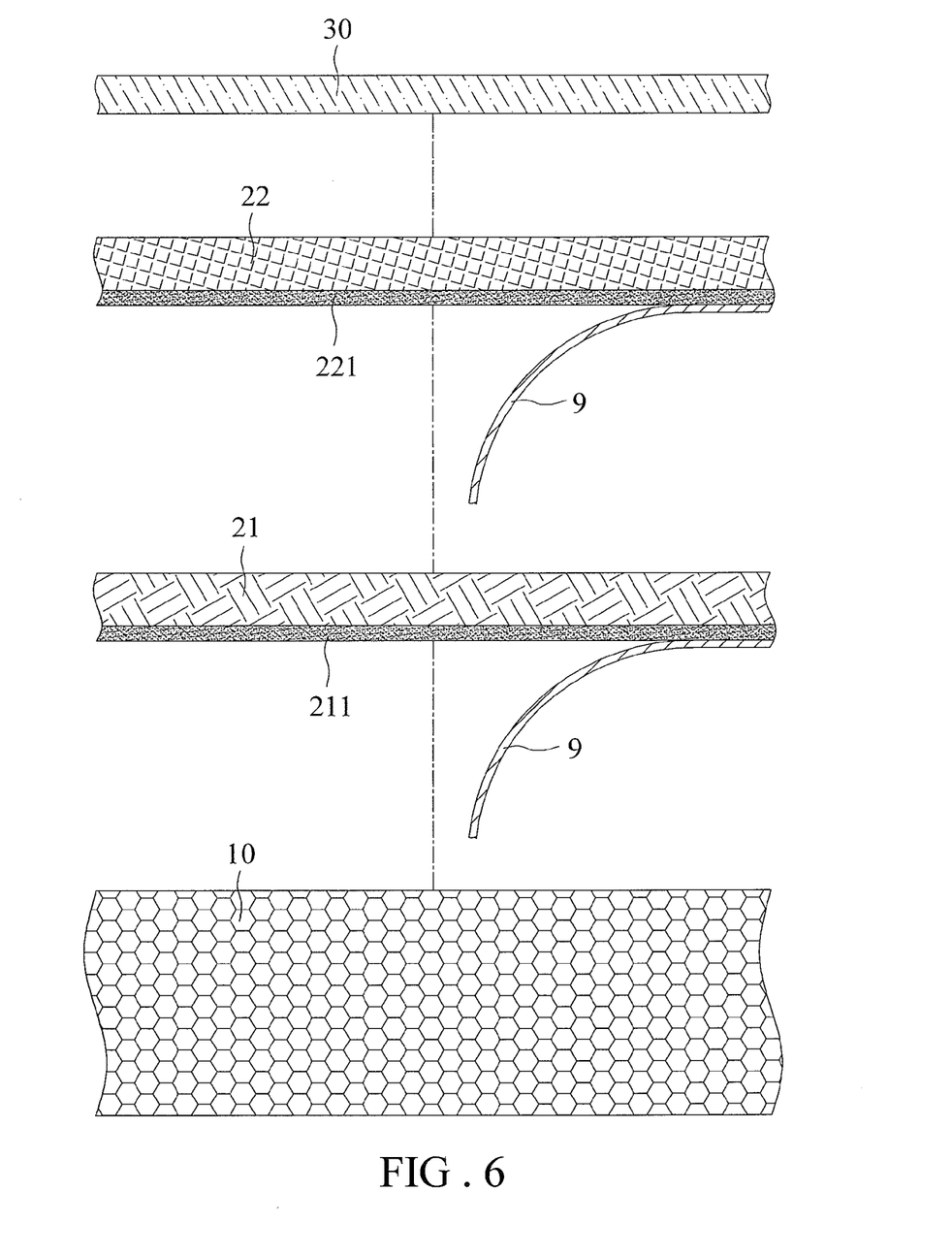
FIG. 6 is a continued cross-section view of FIG. 5 and shows a release liner of each of the first and second plates detached.
Figure 7:
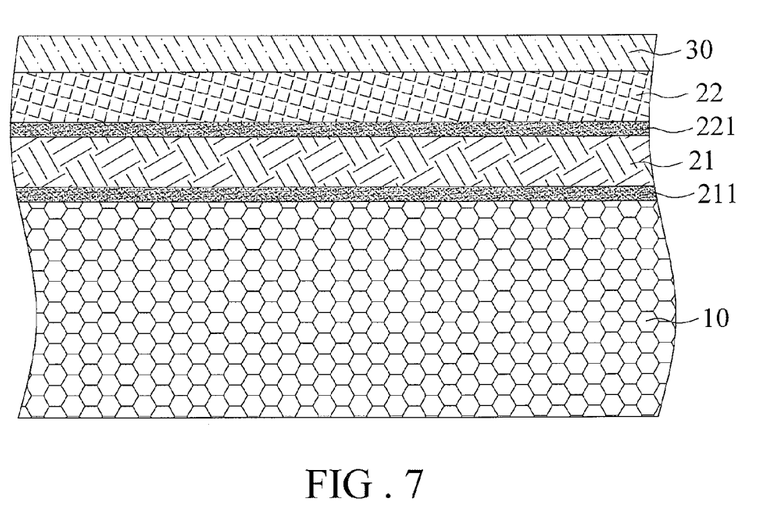
FIG. 7 shows a fixing layer stacked onto the base to form a stacked array.

Referring to FIGS. 6 and 7, the first plate 21 is stacked onto a surface of the base 10 with the release liner 9 detached, and the second plate 22 is stacked onto the first plate 21 with the release liner 9 detached. In a preferred form, each of the base 10, the first and second plates 21 and 22 are disposed to a fixture (not shown), sequentially. The hot melt glue layer 211 of the first plate 21 is connected to the surface of the base 10, and the hot melt glue layer 221 of the second plate 22 is connected to the distal side of the first plate 21. Preferably, a periphery of the second plate 22 extends outside a periphery of the first plate 21. Hence, the second plate 22 has a first section directly disposed to the first plate 21 and a second section directly disposed to the base 10.

The fixing layer 30 is stacked onto the base 10 to form a stacked array. Preferably, the first and second plates 21 and 22 are sandwiched between the base 10 and the fixing layer 30 and are fixed by the fixing layer 30 such that the first and second plates 21 and 22 are prevented from moving with respect to the base 10.

Figure 8:
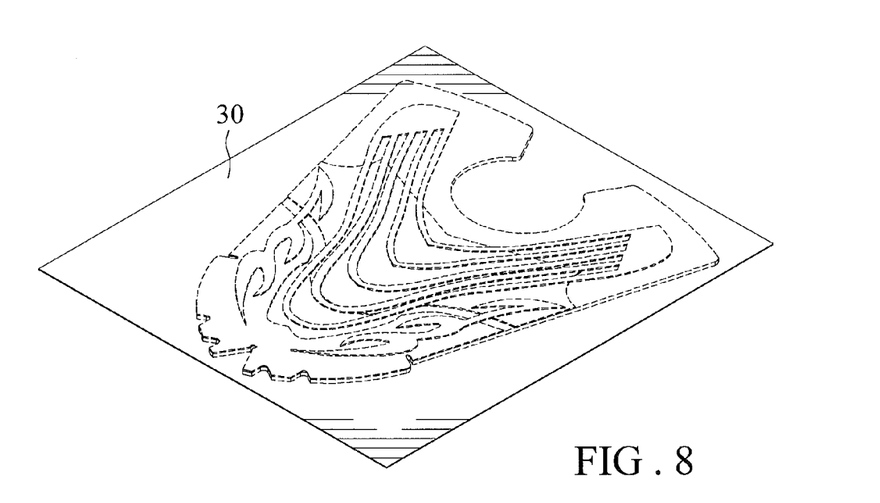
FIG. 8 is a perspective view of the stacked array of FIG. 7.
Figure 9:
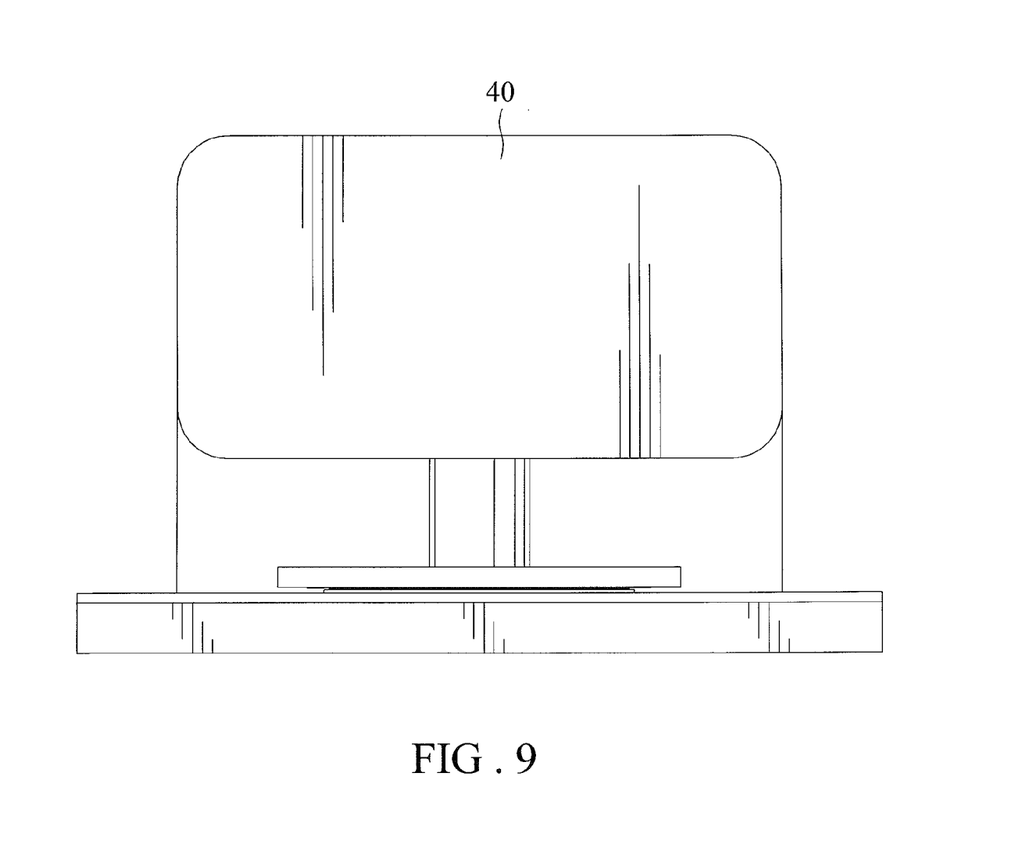
FIG. 9 shows the stacked array heated and pressed by a hot pressing apparatus.

Referring to FIGS. 8 and 9, simultaneously, the stacked array is detached from the fixture and is disposed in a hot press apparatus 40, in which the hot press apparatus 40 is of a preferred temperature, time and pressure. The stacked array is heated and is pressed by the hot press apparatus 40 such that the base 10 and the first and second plates 21 and 22 would be tightly connected with each other.

Figure 10:
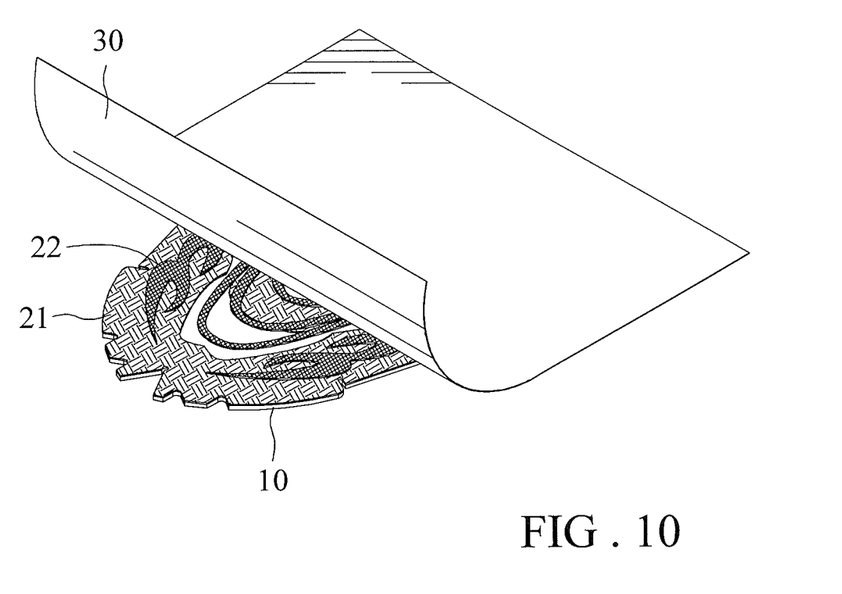
FIG. 10 shows the fixing layer detached.

Referring to FIG. 10, while the fixing layer 30 is removed from the base 10, the process of fabricating the multi-layer decorating element is finished.

The first and second plates 21 and 22 are connected with each other by hot pressing rather than stitching, thereby allowing the multilayer decorating element to be processed accurately, conveniently and in a cost-saving manner.

Figs. 11 through 14 show a multi-layer decorating element in accordance with a second embodiment of the present invention. Parts of the multi-layer decorating element of the second embodiment corresponding to parts of the multi-layer decorating element of the first embodiment have the same reference numerals with the suffix "b". The second embodiment is like the fist embodiment except that contours of the first and second plates 21b and 22b of the second embodiment are different from that of the first embodiment. Preferably, the second plate 22b has a thickness larger than that of the first plate 21b so that a surface of the multi-layer decorating element has ridges and hills irregularly. Additionally, a periphery of the second plate 22b is completely within a periphery of the fist plate 21b. Hence, the second plate 22b has a first section directly disposed to the fist plate 21b and a second section directly disposed to the base 10b.

Figure 11:
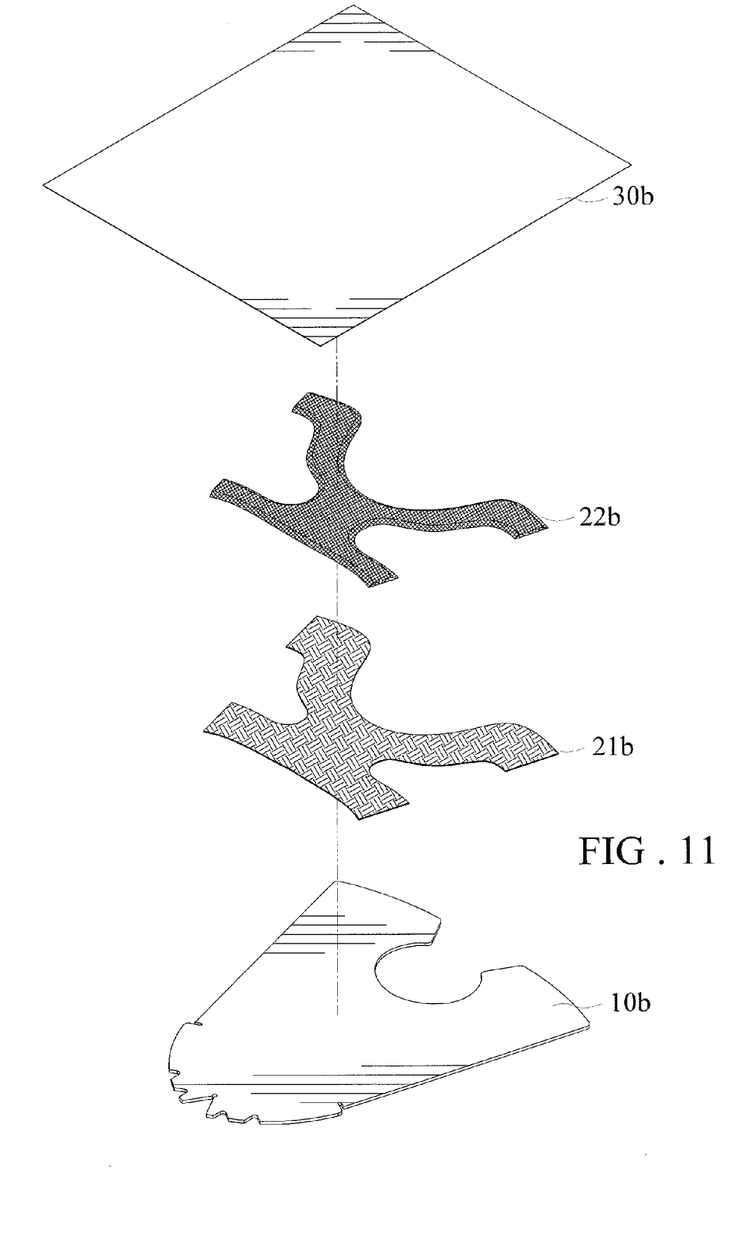
FIG. 11 is an exploded perspective view of the multi-layer decorating element in accordance with a second embodiment of the present invention.

In a preferred from, each of the fixing layer 30b, the first and second plates 21b and 22b is disposed to a fixture (not shown), sequentially. The hot melt glue layer 211b of the first plate 21b is connected to the surface of the base 10b, and the hot melt glue layer 221b of the second plate 22b is connected to the distal side of the fist plate 21b.

Figure 12:
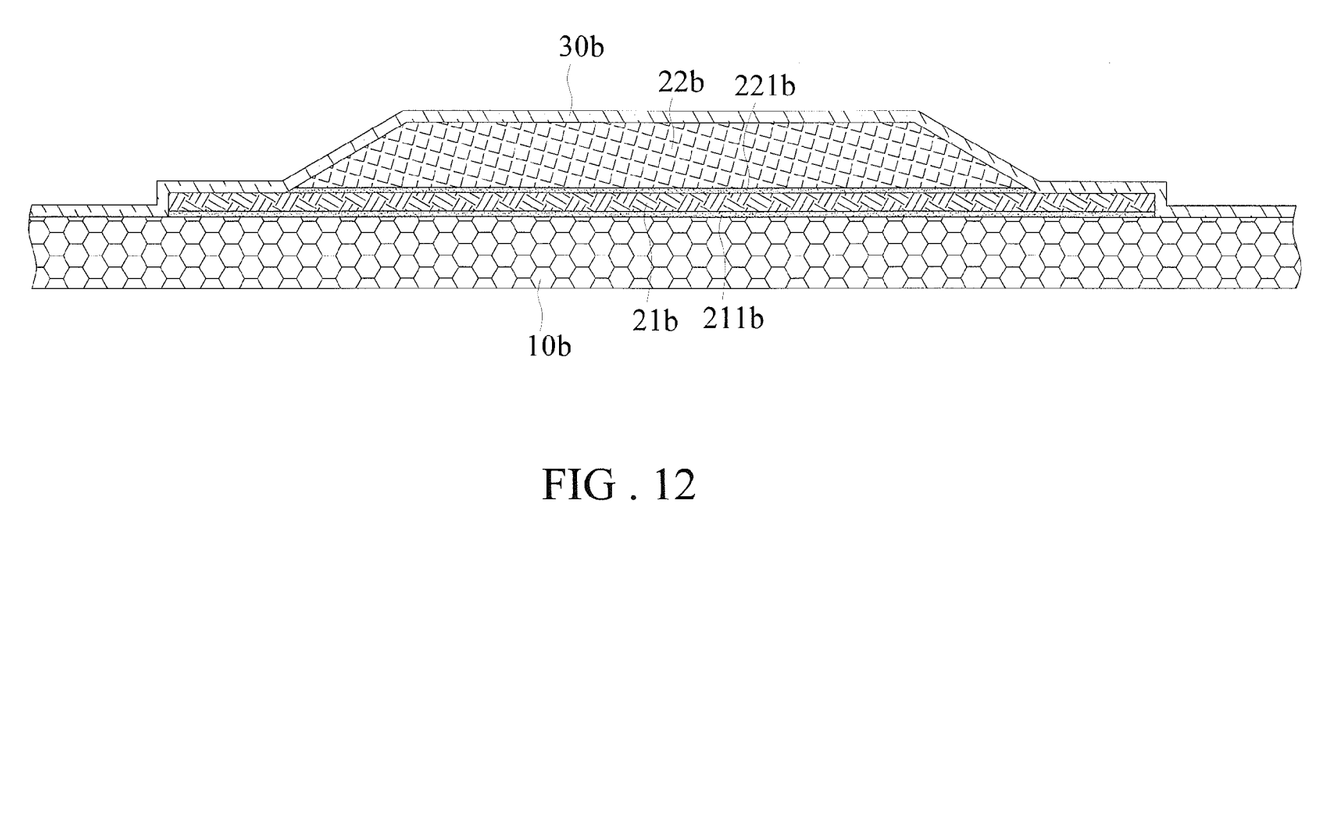
FIG. 12 shows the fixing layer stacked onto the base to form the stacked array.

The fixing layer 30b is stacked onto the base 10b to form a stacked array. Preferably, the first and second plates 21b and 22b are sandwiched between the base 10b and the layer 30b and are fixed by the fixing layer 30b such that the first and second plates 21b and 22b are prevented from moving with respect to the base 10b.

Figure 13:
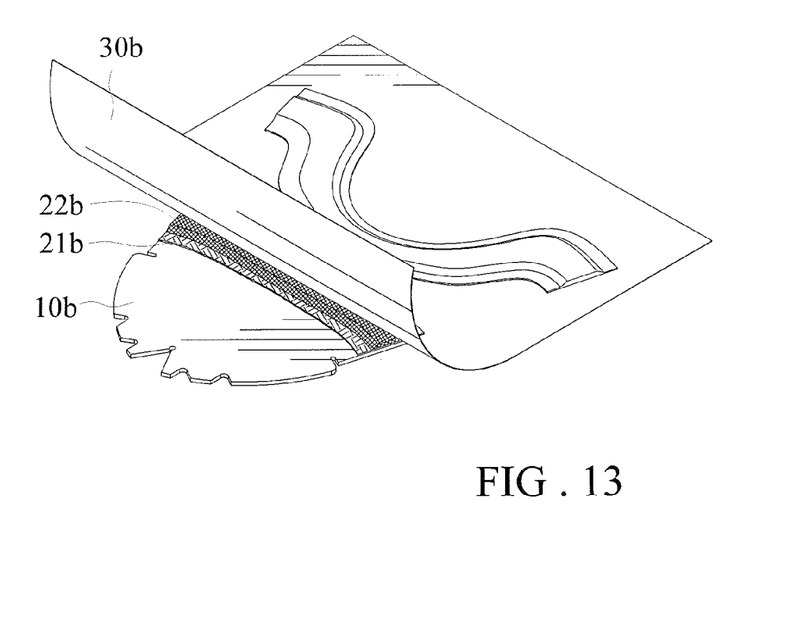
FIG. 13 shows the fixing layer detached.
Figure 14:
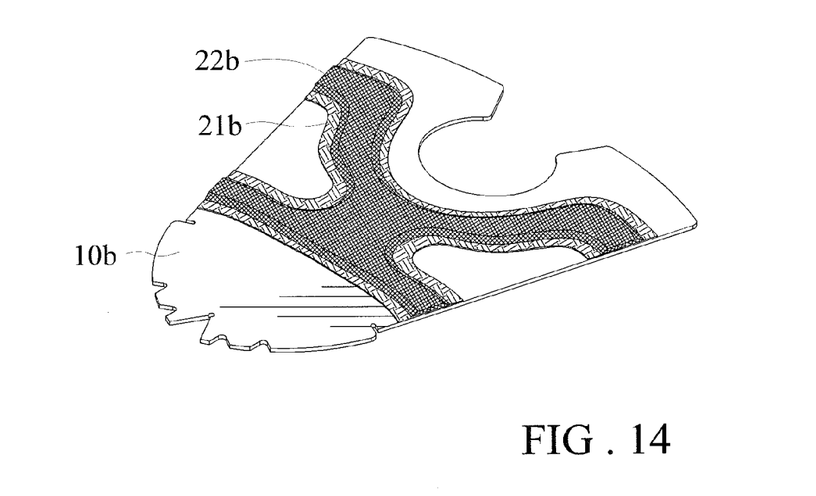
FIG. 14 is a perspective view of the multi-layer decorating element in accordance with the second embodiment of the present invention.

Then, the stacked array is detached from the fixture and is disposed in a hot press apparatus. The stacked array is heated and is pressed by the hot press apparatus such that the base 10b and the first and second plates 21b and 22b would be tightly connected with each other.

Figure 15:
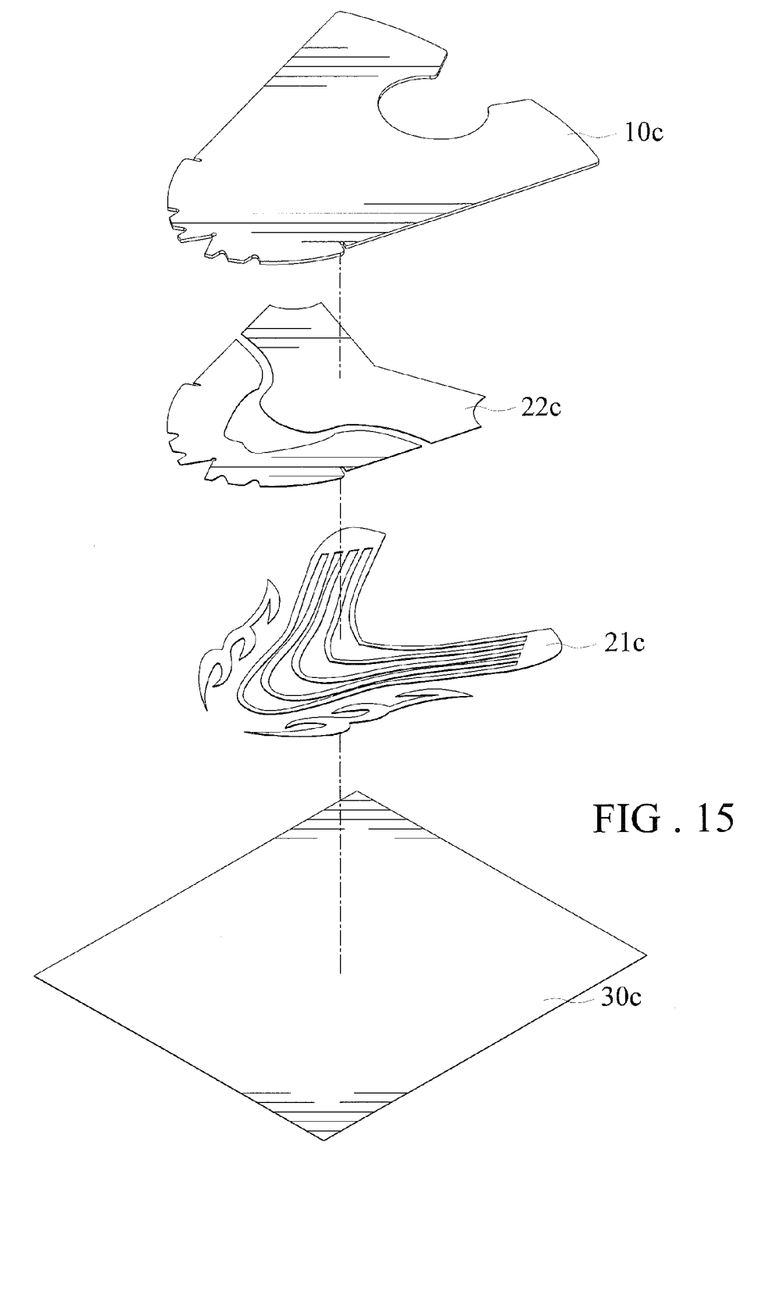
FIG. 15 is an exploded perspective view of the multi-layer decorating element in accordance with a third embodiment of the present invention.
Figure 16:
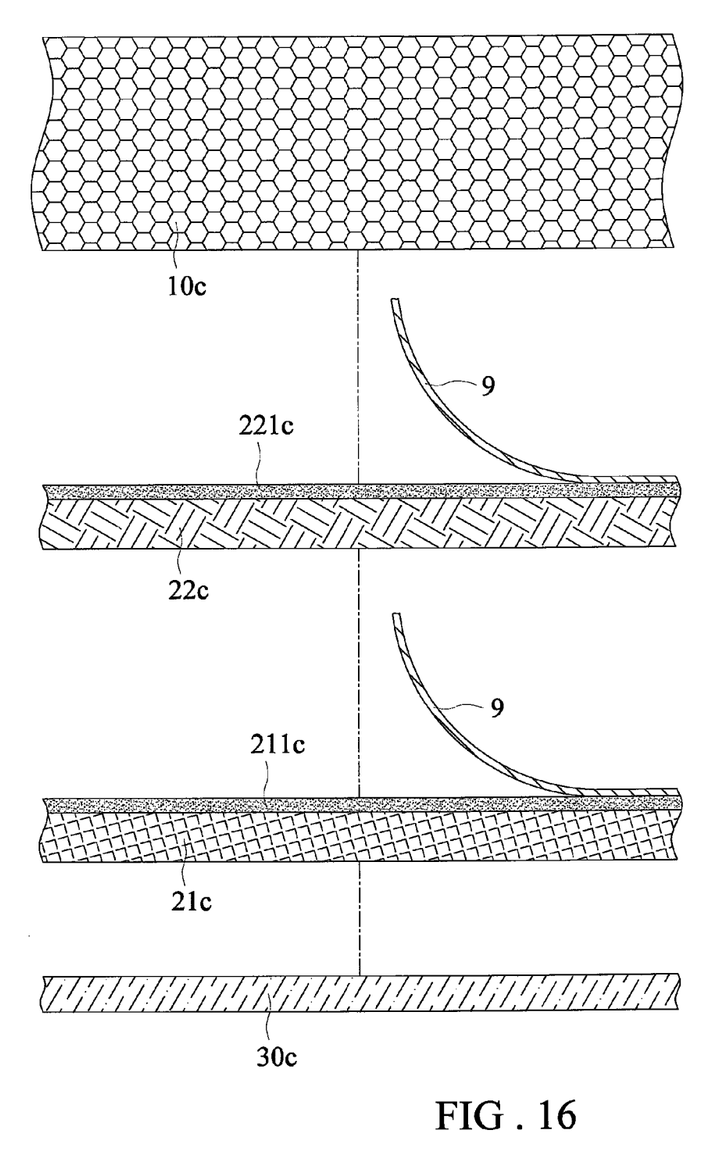
FIG. 16 shows the release liner of each of the first and second plates detached.
Figure 17:
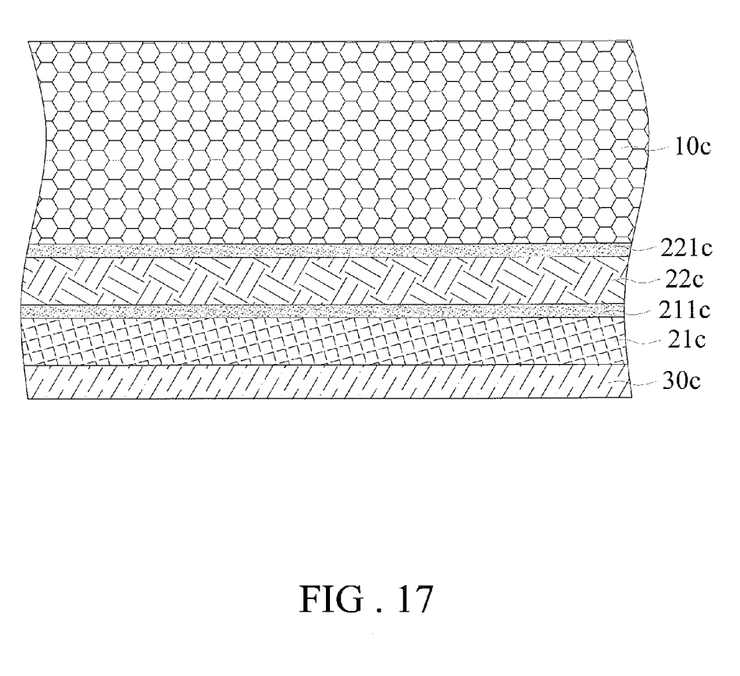
FIG. 17 shows the base stacked onto the fixing layer to form the stacked array.

FIGS. 15 through 17 show a multi-layer decorating element in accordance with a third embodiment of the present invention. Parts of the multi-layer decorating element of the third embodiment corresponding to parts of the multi-layer decorating element of the first embodiment have the same reference numerals with the suffix "c". The second embodiment is like the first embodiment except that a stacking sequence of the stacked array of the third embodiment is different from that of the first embodiment.

While stacking the first and second plates 21c and 22c onto the fixing layer 30c, the first plate 21c is stacked onto a surface of the fixing layer 30c, and, then, the release liner 9c thereof is detached. The second plate 22c is stacked onto the first plate 21c, and, then, the release liner 9c thereof is detached. In a preferred form, each of the first and second plates 21c and 22c is disposed to a fixture (not shown), sequentially. The distal side of the first plate 21c is connected to the surface of the fixing layer 30c and the distal side of the second plate 22c is connected to the hot melt glue layer 211c of the first plate 21c. Preferably, a periphery of the second plate 22c extends outside a periphery of the first plate 21c.

The base 10c is stacked onto the hot melt layer 221c to form a stacked array. Preferably, the first and second plates 21c and 22c are sandwiched between the base 10c and the fixing layer 30c and are fixed by the fixing layer 30c such that the first and second plates 21c and 22c are prevented from moving with respect to the base 10c. Additionally, the second plate 22c has a first section directly connected to the first plate 21c and a second section directly connected to the base 10c.

Figure 18:
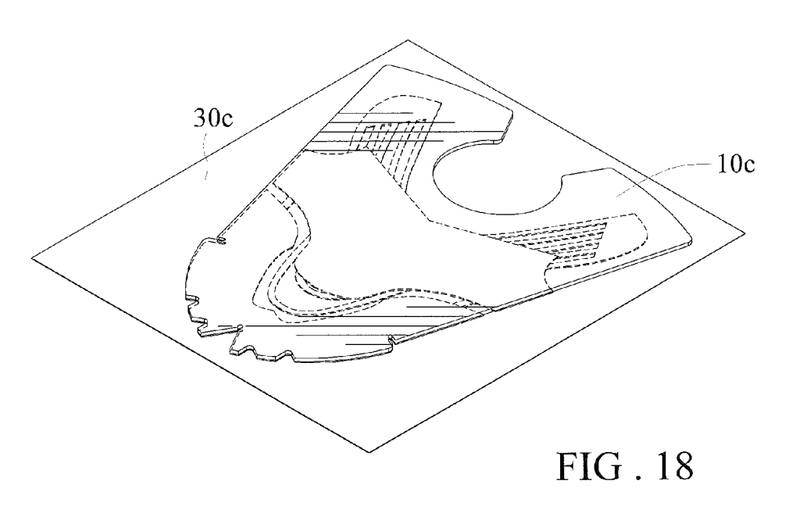
FIG. 18 is a perspective view of the stacked array of FIG. 17.
Figure 19:
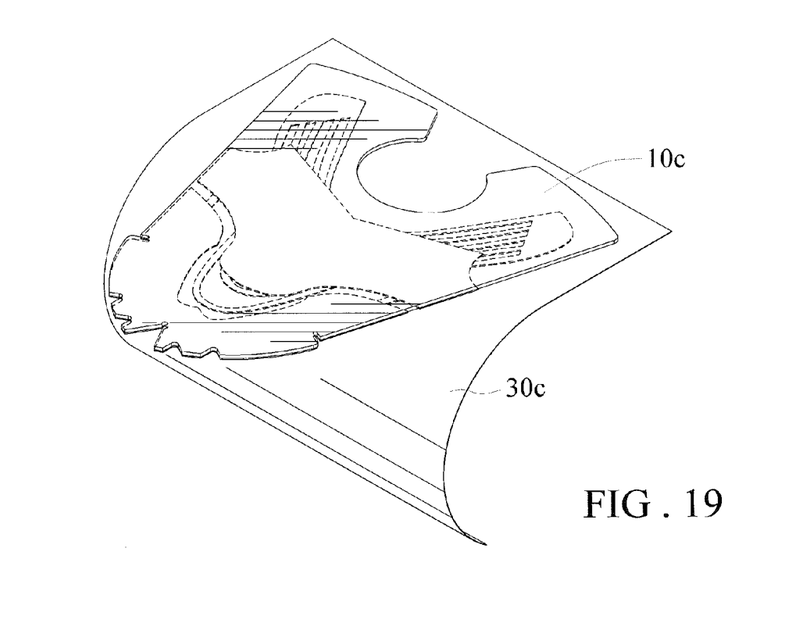
FIG. 19 shows the fixing layer detached.

The stacked array is detached from the fixture and is disposed in a hot press apparatus (not shown). Referring to FIGS. 18 and 19, while the fixing layer 30c is removed from the base 10c, the process of fabricating the multi-layer decorating element is finished.

The present invention has been described through the illustration of the embodiments. Those skilled in the art can derive variations from the embodiments without departing from the scope of the present invention. Hence, the embodiments shall not limit the scope of the present invention defined in the claims.

What is claimed is:

1. A method for producing a multi-layer decorating element comprising:
   providing a base, a first plate, a second plate, and a fixing layer;
   positioning said second plate onto said first plate to form an assembly;
   positioning said assembly onto said base;
   attaching said fixing layer to said assembly and said base;
      wherein said assembly is sandwiched between said fixing layer and said base and fixing said first plate, said second plate and said base in a fixed position to form a stack array;
   hot pressing said stack array; and
   removing said fixing layer from said hot pressed stacked array.

2. The method for producing the multi-layer decorating element as claimed in claim 1, wherein each of the base, the first plate and the second plate is cut to a required shape, respectively.

3. The method for producing the multi-layer decorating element as claimed in claim 1, wherein the first plate is constructed of thermoplastic polyurethane or polyurethane, wherein the first plate includes a proximal side, a distal side opposite from the proximal side and a hot melt glue layer provided on the proximal side thereof in which the hot melt glue layer has a release liner in releasable contact therewith, wherein the second plate is constructed of thermoplastic polyurethane or polyurethane, wherein the second plate includes a proximal side, a distal side opposite from the proximal side and a hot melt glue layer provided on the proximal side thereof in which the hot melt glue layer has a release liner in releasable contact therewith.

4. The method for producing the multi-layer decorating element as claimed in claim 3, wherein each of the base, the first plate and the second plate is disposed to a fixture, sequentially, wherein the first plate is stacked onto a surface of the base with the release liner detached, and the second plate is stacked onto the first plate with the release liner detached, wherein the hot melt glue layer of the first plate is connected to the surface of the base and the hot melt glue layer of the second plate is connected to the distal side of the first plate.

5. The method for producing the multi-layer decorating element as claimed in claim 1, wherein the second plate has a periphery which is completely within that of the first plate.

6. The method for producing the multi-layer decorating element as claimed in claim 1, wherein the second plate has a periphery which extends outside that of the first plate.

7. The method for producing the multi-layer decorating element as claimed in claim 1, wherein the second plate has a thickness larger than that of the first plate.

8. The method for producing the multi-layer decorating element as claimed in claim 1, wherein the first plate includes a proximal side, a distal side opposite from the proximal side and a hot melt glue layer provided on the proximal side thereof in which the hot melt glue layer has a release liner in releasable contact therewith, wherein the second plate includes a proximal side, a distal side opposite from the proximal side and a hot melt glue layer provided on the proximal side thereof in which the hot melt glue layer has a release liner in releasable contact therewith, wherein each of the fixing layer, the first plate and the second plate is disposed to a fixture, sequentially, wherein the first plate is stacked onto a surface of the fixing layer, then, the release liner thereof is detached, wherein the second plate is stacked onto the first plate, then, the release liner thereof is detached, wherein the distal side of the first plate is connected to the surface of the fixing layer and the distal side of the second plate is connected to the hot melt glue layer of the first plate.

9. The method for producing the multi-layer decorating element as claimed in claim 8, wherein the stacked array is detached from the fixture and is disposed in a hot press apparatus.

10. The method for producing the multi-layer decorating element as claimed in claim 9, wherein the stacked array is heated and is pressed by the hot press apparatus such that the base and the first and second plates are tightly connected with each other.

* * * * *